United States Patent [19]

Kazecki et al.

[11] Patent Number: 4,930,126
[45] Date of Patent: May 29, 1990

[54] TIME DIVISION MULTIPLEX SYSTEM SUITED FOR BURST ANALOG TRANSMISSION

[75] Inventors: Henry L. Kazecki, Arlington Heights; James C. Baker, Hanover Park, both of Ill.

[73] Assignee: Motorola, Inc., Schaumburg, Ill.

[21] Appl. No.: 362,634

[22] Filed: Jun. 5, 1989

[51] Int. Cl.⁵ .............................................. H04J 3/00
[52] U.S. Cl. ...................................... 370/109; 370/77
[58] Field of Search ................... 370/77, 108, 109, 58, 370/118, 119; 341/141, 155, 156, 158, 163

[56] References Cited

U.S. PATENT DOCUMENTS

| | | | |
|---|---|---|---|
| 4,112,427 | 9/1978 | Höfer et al. | 370/77 |
| 4,143,242 | 3/1979 | Horiki | 370/58 |
| 4,377,860 | 3/1983 | Godbole | 370/119 |
| 4,635,249 | 1/1987 | Bortolini et al. | 370/58 |
| 4,754,450 | 6/1988 | Lynk, Jr. et al. | 370/118 |

Primary Examiner—Douglas W. Olms
Assistant Examiner—Alpus H. Hsu
Attorney, Agent, or Firm—Charles L. Warren

[57] ABSTRACT

The transmission and reception of burst analog signals, such a voice signal, over a TDM system is improved according to the present invention by minimizing discontinuities between the signal at the end of its time slot in one frame relative to the beginning signal at its next time slot in the following TDM frame. In the TDM transmitter, stored digital information transmitted during its time slot is reprocessed during the preceding time slot in the next frame in order to maintain magnitude continuity. In the TDM receiver, the feedback signal to an analog to digital conversion circuit is switched during non-active time slots to follow data being clocked out of a digital storage element at a frame rate such that the data clocked out preceding the next active time slot will correspond to the data present at the end of the preceding active time slot.

17 Claims, 1 Drawing Sheet

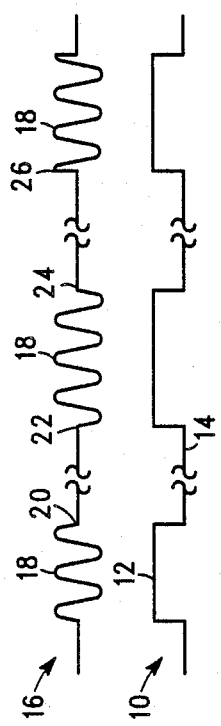
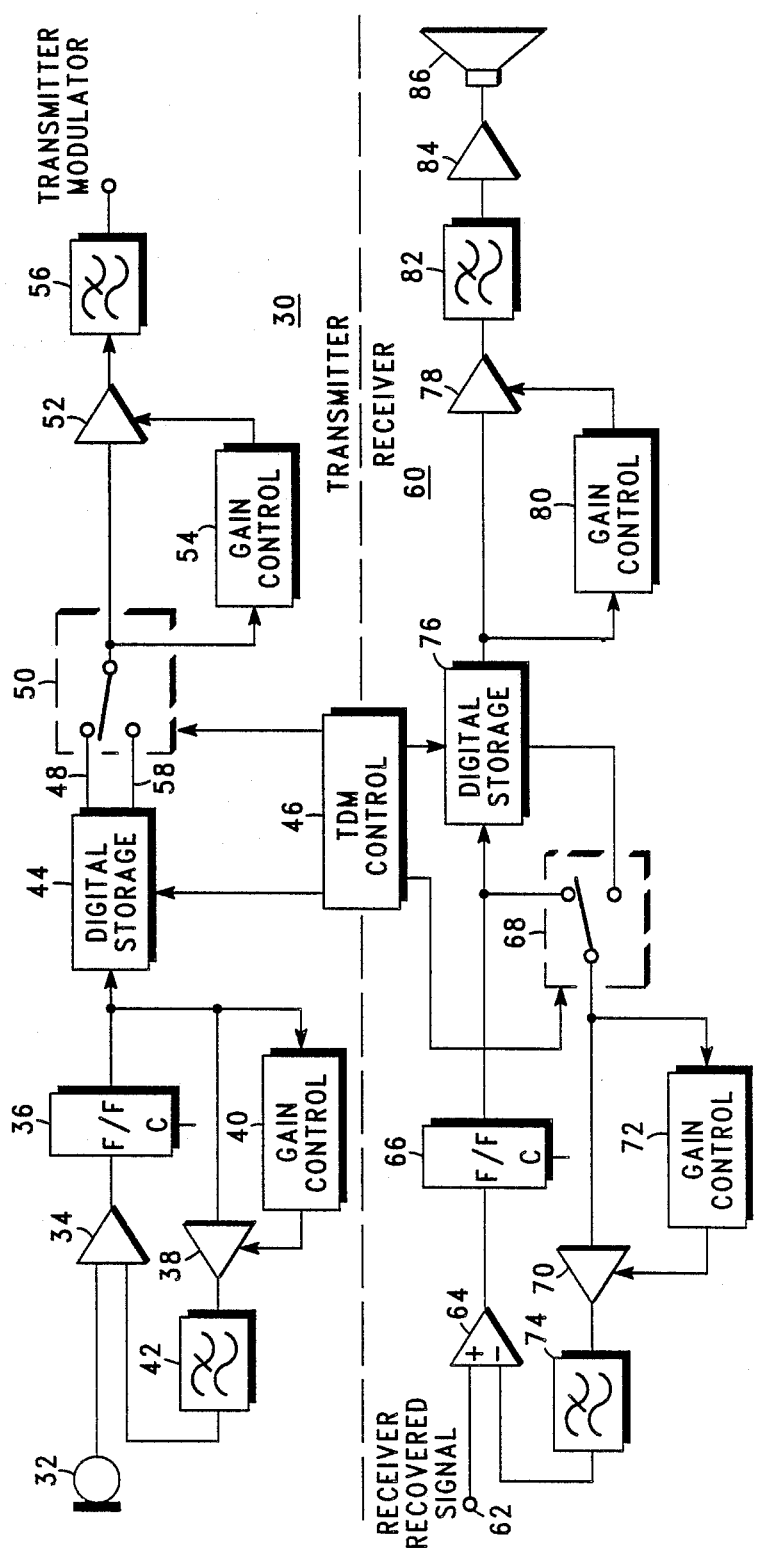
FIG. 1
FIG. 2

TIME DIVISION MULTIPLEX SYSTEM SUITED FOR BURST ANALOG TRANSMISSION

BACKGROUND OF THE INVENTION

This invetion relates to time division multiplex (TDM) systems and is especially suited for such systems capable of voice transmission via burst analog signalling.

In a conventional TDM system a single communication path is used to concurrently carry a plurality of information. A predetermined time interval or frame is defined in which time slots are allocated and correspondence to different information channels.

For information such as digital data the time delay associated with the frame length between transmissions is normally not a problem. However, other signal such as voice require continuous signal handling capabilities.

In one approach to utilize a TDM path to carry voice, an input voice signal is converted to digital data and compressed in time so that voice duting a frame occupies only one time slot. It is demultiplexed at the receiving station by expanding in time the compressed signal.

The quality of a voice transmitted by this method suffers degradation due to transients or "glitches" associated with discontinuities between the magnitude of the signal at the end of one time slot and the beginning magnitude of the signal at the beginning of the time slot in the next frame.

It is an object of the present invention to provide an improved TDM transmitter and receiver which minimize such transients.

BRIEF DESCRIPTION OF THE DRAWINGS

FIG. 1 illustrates TDM waveforms associated with the transmition of information by analong signals.

FIG. 2 illustrates an embodiment of a transmitter and receiver according to the present invention.

DESCRIPTION OF PREFERRED EMBODIMENTS

Before describing the preferred embodiments, it should be noted that an important aspect of the present invetion resides in the specific identification of the transient problem which gives rise to degraded quality in burst analog TDM system. The improvements buought about by the present invention would not have been possible without the identification and understanding of this problem.

In the following description it is assumed that the incoming analog signal to be processed and communicated over the TMD system represents voice. However, it will be appreciated that any signal or data represented by an analog signal will benefit from this invention.

Referring to FIG. 1, waveform 10 illustrates time slots in a TDM channel in which slot 12 is associated with the signal to be transmitted and slots 14 provede for the communication of other signals. The distance from the bigginning of waveform 12 to the end of waveform 14 defines the TDM frame. The number of time slots associated with sigment 14 depends upon the number of signals to be simultaneously carried by the TMD system.

Waveform 16 represents a particular channel having voice information to be communicated during time slot 12. The analog voltage waveforms 18 represent "bursts" of analog information. For purposes of illustration, the waveform at the beginning of a time slot (point 22) is substantially continuous in magnitude and phase with the waveform at the end of the preceding time slot (point 20). However, it wil be apparent that the waveform at point 26 is not continuous relative to the magnitude and phase of the waveform at point 24 at the end of the preceding time slot. Such discontinuities arise because analog circuits at a conventioal TDM transmitter and receiver do not "remember" or hold the signal magnitude at the end of a time slot over the frame interval until the beginning of the next corresponding time slot. These discontinuities give rise to a transient which results in voice quality degradation in the reconstituted audio signal at the receiver. It is an object of the present invetion to minimize such discontinuities.

Referring to FIG. 2, an embodiment of a transmitter 30 according to the present invetion is illustracted above the dashed line. An analog voice signal is coupled by microphone 32 to a continuous variable slope delta (CVSD) modulator which provides a cost effective circuit of low complexity for converting the analog voice signal into a digital signal. This known circuit consists of a comparator 34, flip flop 36, variable gain amplifier 38, gain control circiut 40, and low pass filter 42 which are connected as shown. This type of modulation is known in the are. The gain and signal magnitude associated with such a CVSD circuit must be known in order to maintain signal continuity between successive signal samples. This circuit pravides a continuous real time stream of digital data corresponding to the incoming analog voice.

A digital storage element 44 which may consist of random access memory is preferably selected to have memory storage capacity to store the digital data occurring during two TDM frames. TDM control element 46 is synchronized to the TDM frame and slots, and controls the writing of the stored digital information from storage element 44 by output 48 and switch 50 to variable gain amplifier 52. Such a TDM control element is well known and used in TDM systems. To achieve time compression, the stored data representing one frame of the input signal is output at a higher clock rate during slot 12. During the other slots 14, storage element 44 continues to accumulate input data. Gain control element 54 controls the gain of amplifier 52 in the same manner in which gain control element 40 controls amplifier 38. The output of amplifier 52 is filtered by low pass filter 56 and constitutes a filtered analog signal utilized by the transmitter modulator. This signal is generally represented by waveforms 18.

The TDM control element 46 control switch 50 and causes it to switch to output 58 from digital storage 44 during the time slot preceding the time slot 12 in each frame. The stored data output to amplier 52 during the preceding slot 12 resent to amplifier 52 by clocking this information from digital storage element 44 during the slot preceding slot 12 in the next frame. This causes gain control 54 and amplifier 52 to return to the gain level and amplitude present at the end of the slot 12 in the preceding frame just prior to the beginning of the next slot 12. This provides both gain and magnitude continuity between the end of the signal at the preceding slot 12 and the beginning of the signal at the next solt 12. The transmitter is disabled or inhibited except during the slots 12 sl that the "resettin" data information processed prior to slot 12 in each frame is not transmitted. This method serves to maintain continuity at the TDM transmitter thereby enhancing quality of the transmitted signal by minimizing such dicontinuities.

An embodiment of a receiver 60 according to the present invention is shown below the dashed line in FIG. 2. Input terminal 62 receives the recovered signal from a conventional receiver, such as a discriminator in an FM receiver. This recovered signal corresponds to the compressed analog signal transmitted by transmitter 30 in accordance with the signal output from element 56. The receiver signal is coupled to a CVSD encoder consisting of comparator 64, flip flop 66, switch 68, controlled gain amplifffier 70, gain control element 72, and low pass filter 74. This CVSD encoder, which corresponds to the CVSD encoder of the transmitter, operates on input analog signal to transform them into digital data.

The encoded digital data is stored by digital storage element 76 which is substantially similar to storage element 44. This storage element should preferably have sufficient capacity to store the compressed data received during two frame. The stored information corresponding to slot 12 is clocked out of storage element 76 at a rate such that the information stored during one time slot 12 is clocked out over one frame. This serves to expand the compressed data back to its original state. The digital output is clocked to variable gain amplifier 78 which has its gain controlled by gain control element 80. The output signal from amplifier 78 is low pass filtered by filter 82, amplified by amplifier 84 and converted into an audible signal by speaker 86.

Although the TDM transmitter and receiver are at different locations, each will contain a TDM control element 46. This control element controls the slot and frame timing. In the receiver, the TDM element controls switcn 68 causing the feedback signal applied to amplifier 70 to switch from the outut of flip flop 66 in the normal encoding state during slot 12 to being coupled to the digital storage element 76 at other times during the frame. This causes the magnitude of amplifier 70 and gain defined by gain control circiut 72 to follow the stored data in digital storage 76. Thus, the end of data correspoding to information received during slot 12 is clocked from digital storage element 76 just prior to the next slot 12 so that the gain and level associated with elements 70 and 72 are equal to the magnitude and gains associated with the end of the preceding slot 12. This provides magnitude and gain continuity at the receiver and thus enhances the output audio quality by minimizing transients due to such discontinuities.

Although the exemplary embodiment illustrates the benefits of the present invetion in a brust analog TDM system carryin voice, it will be apparent that other analog signals or digital signals transmitted as analog information could benefit from the present invetion. Those skilled in the art will appreciate that the concept of the present invention can be implemented in different configurations including software where the functions are performed in accordance with digital signal processing techniques.

Although the embodiments of the present invention have been described above and illustrated in the drawings, the scope of the invention is defined by the claims which follow.

What is claim is

1. A time division multiplexed (TDM) transmitter in which an input signal is compressed in time before transmission to form a compressed signal, at least first and second time slots exist in each TDM frame with the transmitter transmitting said compressed signal during said first slot, the transmitter comprising:
   means for storing digital data correspoding to said input signal;
   means for converting said digital data into an analog signal used to modulate said transmitter;
   first means for transferring said digital data stored during one frame to said converting means during said first slot;
   second means for transferring said digital data stored during one frame to said converting means during the slot preceding said first slot during the next frame to maintain magnitude continuity from the end of the first slot in the first frame to the beginning of the first slot in the next frame thereby minimizing undesired due to magnitude discontinuities.

2. The transmitter according to claim 1 further comprising means for converting an analog input signal into said digital data.

3. The transmitter according to claim 2 wherein said analog input signal comprises voice.

4. A time division multiplexed (TDM) receiver for receiver an analog signal which has been compressed in time before transmission to form a compressed signal, at least first and second time slots exist in each TDM frame with the receiver receiving said compressed signal during said first slot and restoring said compressed signal to its original state, the receiver comprising:
   first means for converting said compressed analog signal into correspondig digital data during said first time slot;
   means for storing said digital data;
   second means for converting said stored digital data into an analog output at a time rate so that said analog output corresponds to the uncompressed analog signal;
   means for causing said first means to begin at the analog signal magnitude at the beginning of a first slot in one frame as existed at the end of the first slot in the preceding frame.

5. The receiver according to claim 4 wherein said first converting means comprises an analog to digital circuit which requires a digital feedback input.

6. The receiver according to claim 5 wherein said causing means includes means for switching said digital feedback input so that it consists of the digital data input to said storing means during the first time slot and consists of the output of said storing means at least during the time slot preceding said first slot.

7. The receiver according to claim 4 wherein said compressed analog signal consists of compressed voice.

8. In a time devision multiplexed (TDM) transmitter in which an input signal is compressed in time before trasnmission to form a compressed signal, at least first and second time slots exist in each TDM frame with the transmitter transmitting said compressed signal during said first slot, a method for minimizing undesired transients comprising the steps of:
   storing digital data corresponding to one frame of said input signal;
   transferring said stored digital data to a means for converting said digital data into an analog signal during said first slot;
   transferring said stored digital data to said converting means during the slot preceding said first during the next frame to maintain magnitude continuity of said input signal from the end of the first slots in one frame to the beginning of first slot in the next frame thereby minimizing undesired transients due to magnitude discontinuities.

9. In a time division multiplexed (TDM) receiver for receiving an analog signal which has been compressed in time before transmission to form a compressed signal, at least first and second time slots exist in each TDM frame with the receiver receiving said compressed signal during said first slot and restoring said compressed signal to its original state, a method for minimizing undesired transients comprising the steps of:
 (a) converting said compressed analog signal into corresponding digital data during said first time slot;
 (b) storing said digital data;
 (c) converting said stored digital data into an analog output at a time rate so that said analog output corresponds to the uncompressed analog signal;
 (d) causing step (a) to start at the analog signal magnitude at the beginning of a first slot in one frame as existed at the end of the first slot in the preceding frame.

10. A time division multiplexed (TDM) transmitter in which an input signal is transmitted, at least first and second time slots exist in each TDM frame with the tranamitter transmitting said input signal during said first slot, the transmitter comprising:
 means for converting said input signal into a corresponding transmission signal for transmission during said first time slot in a first frame, said transmission signal at the end of said first time slot in said first frame having an associated signal value;
 means for causing said converting means to begin at said associated signal value at the beginning of a first slot in the next frame to minimize discontinuities.

11. The transmitter according to claim 10 wherein said causing means comprises means for storing at least said associated signal value during said first frame and means for initializing said converting means to said stored associated signal value just prior to said first time slot in the next frame.

12. The transmitter according to claim 11 wherein said storing means comprises means for storing digital data corresponding to said input signal during said first time slot in said first frame.

13. The transmitter according to claim 12 wherein said initializing means comprises means for reprocessing said stored digital data by said converting means so that said reprocessing ends just prior to the first time slot in the next frame.

14. A time division multiplexed (TDM) receiver for receiving a first signal, at least first and second time slots exist in each TDM frame with the receiver receiving said first signal during said first slot, the receiver comprising:
 demodulation means for converting said received first signal into a corresponding output signal, said received first signal at the end of said first time slot in a first frame having an associated signal valve;
 means for causing said demodulation means to begin at said associated signal value at the beginning of a first time slot in the next frame to minimize discontinuities.

15. The receiver according to claim 14 wherein said causing means comprises means for storing at least said associated signal value during said first frame and means for initializing said demodulation means to said stored associated signal just prior to said first time slot in the next frame.

16. The receiver according to claim 15 wherein said storing means comprises means for storing digital data corresponding to said received first signal during said first time slot in said first frame.

17. The receiver according to claim 16 wherein said initializing means comprises means for reprocessing said stored digital data by said demodulation means so that said reprocessing ends just prior to the first time slot in the next frame.

* * * * *